United States Patent
Wang et al.

(10) Patent No.: US 9,900,590 B2
(45) Date of Patent: Feb. 20, 2018

(54) DISPLAY PANEL AND METHOD OF DRIVING THE SAME, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Chunbing Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 14 days.

(21) Appl. No.: 14/744,375

(22) Filed: Jun. 19, 2015

(65) Prior Publication Data

US 2016/0277730 A1    Sep. 22, 2016

(30) Foreign Application Priority Data

Mar. 18, 2015 (CN) .......................... 2015 1 0119492

(51) Int. Cl.
*G09G 3/34* (2006.01)
*H04N 13/04* (2006.01)
*G09G 3/00* (2006.01)

(52) U.S. Cl.
CPC ......... *H04N 13/0452* (2013.01); *G09G 3/003* (2013.01); *H04N 13/0422* (2013.01);
(Continued)

(58) Field of Classification Search
CPC ........... H04N 13/0452; H04N 13/0422; G09G 3/003; G09G 2340/0414;
(Continued)

(56) References Cited

U.S. PATENT DOCUMENTS 7,123,277 B2 * 10/2006 Brown Elliott ....... G06T 3/4015
345/426
7,184,066 B2 * 2/2007 Elliot ....................... G09G 3/20
345/694
(Continued)

FOREIGN PATENT DOCUMENTS

CN           1612024 A      5/2005
CN         103348687 A     10/2013
(Continued)

OTHER PUBLICATIONS

Office Action dated Jul. 1, 2016 issued in corresponding Chinese Application No. 201510119492.0.

*Primary Examiner* — Jose Soto Lopez
(74) *Attorney, Agent, or Firm* — Nath, Goldberg & Meyer; Joshua B. Goldberg

(57) ABSTRACT

The embodiments of the present invention provide a display panel and a driving method thereof, and a display device. The display panel comprises a plurality of pixel groups, each of which comprises four different sub-regions arranging in a matrix with two rows and two columns, each of the sub-regions has one first color subpixel, one second color subpixel, one third color subpixel and one fourth color subpixel arranging in a matrix with two rows and two columns, each row of subpixels in the pixel group consist of one first color subpixel, one second color subpixel, one third color subpixel and one fourth color subpixel, and a first row of subpixels and a fourth row of subpixels in the pixel group have the same arrangement structure of subpixels, and a second row of subpixels and a third row of subpixels in the pixel group have the same arrangement structure of subpixels.

7 Claims, 2 Drawing Sheets

(52) U.S. Cl.
CPC ........... *G09G 2300/0404* (2013.01); *G09G 2300/0443* (2013.01); *G09G 2300/0452* (2013.01); *G09G 2310/0205* (2013.01); *G09G 2320/0233* (2013.01); *G09G 2340/0414* (2013.01)

(58) Field of Classification Search
CPC ... G09G 2310/0205; G09G 2300/0404; G09G 2300/0452; G09G 2320/0233; G09G 2300/0443
See application file for complete search history.

(56) References Cited

U.S. PATENT DOCUMENTS

| | | | | |
|---|---|---|---|---|
| 7,221,381 | B2* | 5/2007 | Brown Elliott | G09G 3/20 345/12 |
| 8,477,150 | B2* | 7/2013 | Inuzuka | G09G 3/3611 345/589 |
| 8,933,959 | B2* | 1/2015 | Brown Elliott | G02B 27/2214 345/589 |
| 2005/0225563 | A1* | 10/2005 | Brown Elliott | G09G 5/02 345/604 |
| 2005/0225575 | A1* | 10/2005 | Brown Elliott | G02F 1/133514 345/694 |
| 2007/0257946 | A1* | 11/2007 | Miller | G09G 3/2003 345/694 |
| 2008/0049047 | A1* | 2/2008 | Credelle | G09G 3/2003 345/690 |
| 2008/0049048 | A1* | 2/2008 | Credelle | G09G 3/2074 345/690 |
| 2013/0113839 | A1* | 5/2013 | Huang | H04N 13/0402 345/690 |
| 2014/0160147 | A1 | 6/2014 | Phan et al. | |
| 2015/0002707 | A1* | 1/2015 | Wu | H01L 27/14621 348/279 |
| 2015/0109494 | A1* | 4/2015 | Tanaka | H04N 9/045 348/277 |
| 2015/0181187 | A1* | 6/2015 | Wu | H01L 27/14621 348/336 |

FOREIGN PATENT DOCUMENTS

CN 103969834 8/2014
CN 104391408 A 3/2015

* cited by examiner

DISPLAY PANEL AND METHOD OF DRIVING THE SAME, AND DISPLAY DEVICE

FIELD OF THE INVENTION

The present invention relates to the field of display technology, and particularly relates to a display panel and a method of driving the display panel, and a display device.

BACKGROUND OF THE INVENTION

With the development of display technology, liquid crystal display technology has been increasingly widely used and plays an important role in industrial production and people's lives.

Currently, 2D/3D switchable liquid crystal display device capable of performing 2D display and 3D display becomes a mainstream trend. If a high-resolution display panel is utilized for improving 2D display quality, when the display panel performs 3D display, requirements on predetermined charging time of pixels and sufficient blanking time between left and right eye pictures are generally not satisfied due to restrictions of display principle and scanning time, so that the crosstalk significantly increases when the display panel performs 3D display and even the display panel will not work properly.

Meanwhile, in conventional 3D display technology, the resolutions of displayed left and right eye pictures are generally reduced when display mode switches from 2D picture display to 3D picture display. In addition, there exists another problem in the conventional 3D display technology, i.e., there exists a significant difference between brightness of displayed 3D picture and brightness of displayed 2D picture.

SUMMARY OF THE INVENTION

In order to solve the technical problem existing in the prior art, the embodiments of the present invention provide a display panel and a method of driving the display panel, and a display device. In the display panel, a plurality of pixel groups having the same internal arrangement structure of subpixels are repeatedly arranged in a matrix throughout the display panel, so that the vertical resolution when the display panel performs 3D display is equal to the vertical resolution when the display panel performs 2D display, and the brightness of picture when the display panel performs 3D display is equal to the brightness of picture when the display panel performs 2D display, thereby allowing the display panel to achieve the same display quality and display effect when performing 3D display as when performing 2D display.

An embodiment of the present invention provides a display panel, comprising a plurality of pixel groups repeatedly arranged in a row direction and a column direction, each of the pixel groups having the same arrangement structure of subpixels, each of the pixel groups comprises four different sub-regions that arrange in a matrix with two rows and two columns; each of the sub-regions has one first color subpixel, one second color subpixel, one third color subpixel and one fourth color subpixel provided therein, and the first color subpixel, the second color subpixel, the third color subpixel and the fourth color subpixel in each of the sub-regions arrange in a matrix with two rows and two columns; each row of subpixels in the pixel group consist of one first color subpixel, one second color subpixel, one third color subpixel and one fourth color subpixel; and a first row of subpixels and a fourth row of subpixels in the pixel group have the same arrangement structure of subpixels, and a second row of subpixels and a third row of subpixels in the pixel group have the same arrangement structure of subpixels.

The first row of subpixels and the fourth row of subpixels in the pixel group may be mirror symmetrical, and the second row of subpixels and the third row of subpixels in the pixel group may be mirror symmetrical.

The second row of subpixels and the third row of subpixels in each row of pixel groups may be mirror symmetrical, and two adjacent rows of subpixels of any two rows of pixel groups adjacent in the column direction may be mirror symmetrical.

The first color subpixel may be a red subpixel, the second color subpixel may be a green subpixel, the third color subpixel may be a blue subpixel, and the fourth color subpixel may be a white subpixel.

The red subpixel, the green subpixel and the white subpixel may have the same area and light transmittance, and the blue subpixel may have the area and the light transmittance less than or equal to those of the white subpixel.

The first color subpixel, the second color subpixel, the third color subpixel and the fourth color subpixel may have the same shape and may all have a rectangle shape.

A length ratio between a long side and a short side of an entire rectangle consisting of the first color subpixel, the second color subpixel, the third color subpixel and the fourth color subpixel in the sub-region may be equal to a length ratio between a long side and a short side of an entire rectangle consisting of the second row of subpixels and the third row of subpixels in the pixel group. The length ratio between the long side and the short side of the entire rectangle consisting of the first color subpixel, the second color subpixel, the third color subpixel and the fourth color subpixel in the sub-region may be equal to a length ratio between a long side and a short side of an entire rectangle consisting of two adjacent rows of subpixels of any two pixel groups adjacent in the column direction of the pixel group.

Another embodiment of the present invention provides a method of driving the above display panel, the method comprising: constituting a pixel of 2D display by using the first color subpixel, the second color subpixel, the third color subpixel and the fourth color subpixel in each sub-region when the display panel performs 2D display; and constituting a pixel of 3D display by using the second row of subpixels and the third row of subpixels in each pixel group and constituting another pixel of 3D display by use of two adjacent rows of subpixels of any two pixel groups adjacent in the column direction of the pixel group when the display panel performs 3D display.

When the display panel performs 3D display, the method may comprise: turning off the first row of subpixels of the pixel groups in the first row and the last row of subpixels of the pixel groups in the last row; driving the second row of subpixels and the third row of subpixels of the pixel groups in a row by using the same data signal at the same time; and driving two adjacent rows of subpixels of two rows of pixel groups adjacent in the column direction by using the same data signal at the same time.

First polarizing films may be provided at the positions corresponding to odd rows of subpixels in each row of pixel groups, and second polarizing films may be provided at the positions corresponding to even rows of subpixels in each row of pixel groups. When the display panel performs 3D display, the method may comprise: turning off the first row of subpixels of the pixel groups in the first row and the last row of subpixels of pixel groups in the last row; driving odd rows of subpixels and even rows of subpixels row by row; forming a left eye picture by using pictures displayed by the odd rows of subpixels of the pixel groups in each row, and forming a right eye picture by using pictures displayed by the even rows of subpixels of the pixel groups in each row, or forming a right eye picture by using pictures displayed by the odd rows of subpixels of the pixel groups in each row, and forming a left eye picture by using pictures displayed by the even rows of subpixels of the pixel groups in each row.

When the display panel is in a normally black display mode, the data signal input into the first row of subpixels of the pixel groups in the first row and the last row of subpixels of the pixel groups in the last row is in low level. When the display panel is in a normally white display mode, the data signal input into the first row of subpixels of the pixel groups in the first row and the last row of subpixels of the pixel groups in the last row is in high level. An initial frame scanning signal of the display panel corresponds to the second row of subpixels of the pixel groups in the first row.

The first color subpixel may be a red subpixel, the second color subpixel may be a green subpixel, the third color subpixel may be a blue subpixel, and the fourth color subpixel may be a white subpixel.

The white subpixels in the display panel may be in a normally black display state or a normally white display state when the display panel performs 2D display. The white subpixels in the display panel may be in the normally white display state when the display panel performs 3D display.

Yet another embodiment of the present invention provides a display device comprising the above display panel.

In the display panel according to the embodiment of the present invention, a plurality of pixel groups having the same internal arrangement structure of subpixels are repeatedly arranged in a manner of matrix throughout the display panel, four colors of subpixels in each sub-region constitute a pixel of 2D display when the display panel performs 2D display, the second row of subpixels and the third row of subpixels in each pixel group constitute a pixel of 3D display and two adjacent rows of subpixels of any two pixel groups adjacent in the column direction of the pixel group constitute another pixel of 3D display when the display panel performs 3D display, so that the number of subpixels in each column of the pixel of 2D display is equal to the number of subpixels in each column of the pixel of 3D display, and the vertical resolution when the display panel performs 3D display is equal to the vertical resolution when the display panel performs 2D display. In addition, the pixel arrangement in the display panel allows the subpixels with any one color in each pixel to include two subpixels with the same color when the display panel performs 3D display, so that the brightness of picture when the display panel performs 3D display has no loss compared with the brightness of picture when the display panel performs 2D display, thereby avoiding the loss of brightness after the display mode of the display panel switches from 2D display to 3D display, which allows the brightness in 3D display to be equal to the brightness in 2D display, and allows the display panel to achieve the same display quality and display effect when performing 3D display and 2D display.

In the method of driving the display panel according to the embodiment of the present invention, on the basis of the pixel arrangement structure of the display panel, switching from 2D display to 3D display can be achieved, and the vertical resolution of 3D picture in the improved shutter 3D display mode and the polarized 3D display mode can be equal to the vertical resolution of 2D picture, so that the display quality and the display effect after switching from 2D display to 3D display are improved.

In the display device according to the embodiment of the present invention, the display quality and the display effect of the display device are improved by utilizing the above display panel.

DESCRIPTION OF THE PREFERRED EMBODIMENT

To make those skilled in the art better understand the technical solutions of the present invention, a display panel and a method of driving the display panel, and a display device according to the present invention will be described in detail below in conjunction with the accompanying drawings and specific embodiments.

Figure 1:
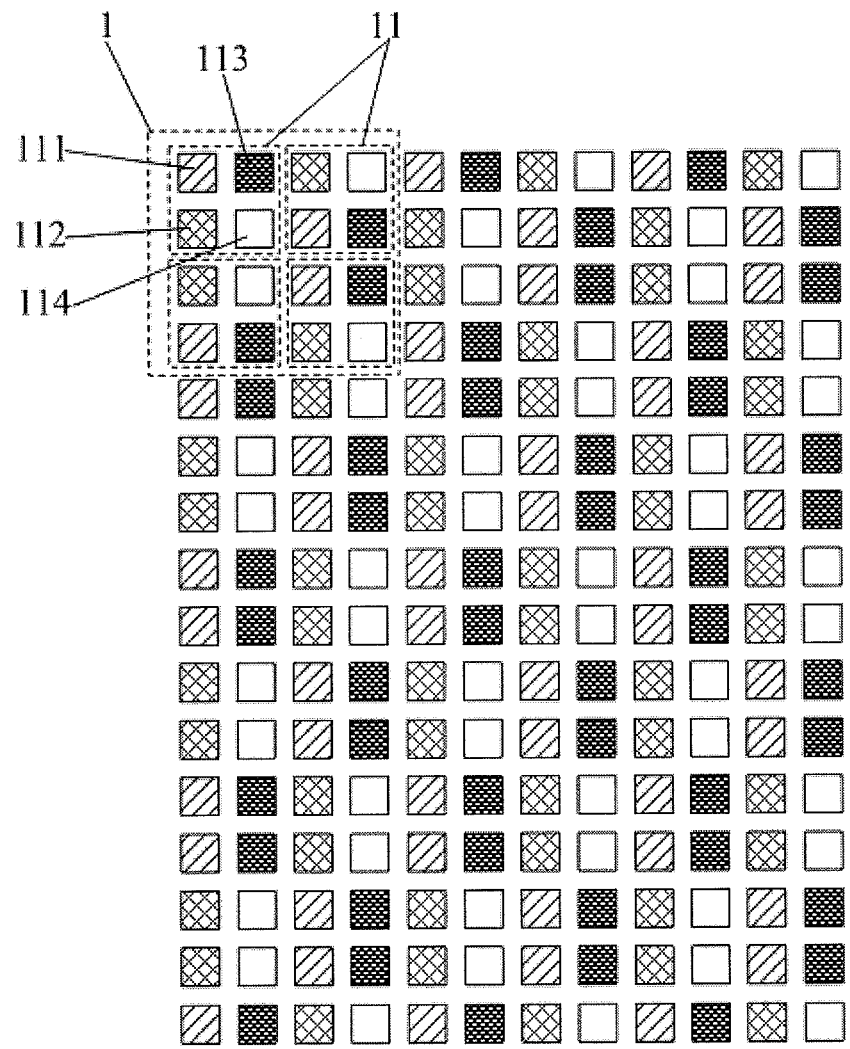
FIG. 1 is a schematic diagram of arrangement of subpixels on a display panel of an embodiment of the present invention.

Referring to FIG. 1, an embodiment of the present invention provides a display panel that comprises a plurality of pixel groups 1 repeatedly arranged in a row direction and a column direction, each of the pixel groups 1 has the same arrangement structure of subpixels, and each of the pixel groups 1 comprises four different sub-regions 11 that arrange in a matrix with two rows and two columns. Each of the sub-regions 11 has one red subpixel 111, one green subpixel 112, one blue subpixel 113 and one white subpixel 114 provided therein, and the red subpixel 111, the green subpixel 112, the blue subpixel 113 and the white subpixel 114 in each of the sub-regions 11 arrange in a matrix with two rows and two columns. Each row of subpixels in the pixel group 1 consist of one red subpixel 111, one green subpixel 112, one blue subpixel 113 and one white subpixel 114. A first row of subpixels and a fourth row of subpixels in the pixel group 1 have the same arrangement structure of subpixels, and a second row of subpixels and a third row of subpixels in the pixel group 1 have the same arrangement structure of subpixels.

Figure 2:
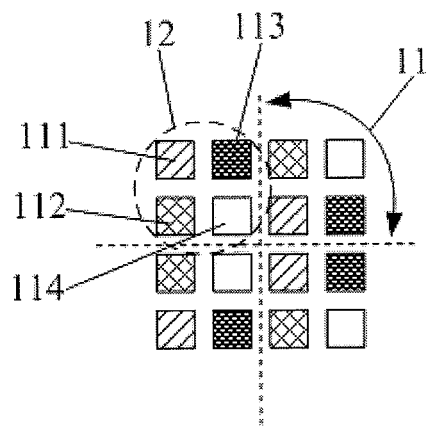
FIG. 2 is a schematic diagram of division of pixels when pixel groups of FIG. 1 are in 2D display mode.
Figure 3:
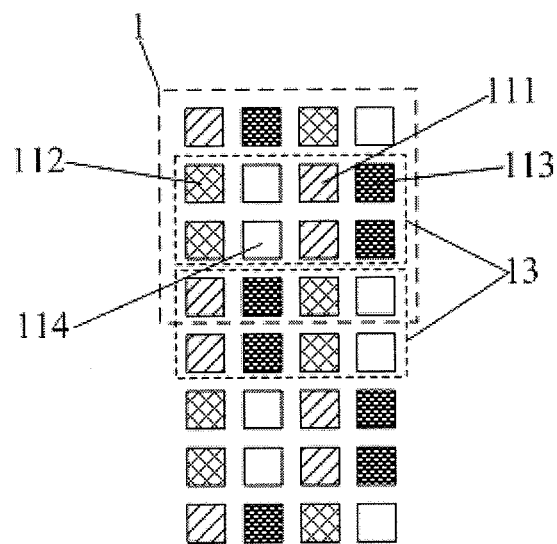
FIG. 3 is a schematic diagram of division of pixels when pixel groups of FIG. 1 are in 3D display mode.

As shown in FIGS. 2 and 3, when the display panel performs 2D display, four colors of subpixels in each of the sub-regions 11 constitute one pixel 12 of 2D display; when the display panel performs 3D display, the second row of subpixels and the third row of subpixels in the pixel group 1 constitute one pixel 13 of 3D display, and two adjacent rows of subpixels of any two pixel groups 1 adjacent in the column direction of the pixel group 1 constitute another pixel 13 of 3D display. As can be seen from above, the number of subpixels in each column of each pixel of 2D display is equal to the number of subpixels in each column of each pixel of 3D display, and thus, the vertical resolution when the display panel performs 3D display is equal to the vertical resolution when the display panel performs 2D display. In addition, when the display panel performs 3D display, the subpixels with any one color in each pixel includes two subpixels with the same color, so that the brightness of picture in 3D display has no loss compared with the brightness of picture in 2D display, thereby avoiding the loss of brightness after the display mode of the display panel switches from 2D display to 3D display, which allows the brightness in 3D display to be equal to the brightness in 2D display, and 3D display quality and 3D display effect of the display panel is improved, which allows the display panel to achieve the same display quality and display effect when performing 3D display and 2D display.

It should be noted that, the vertical resolution of 3D display relates to the number of subpixels in the column direction of the pixel of 3D display, and the vertical resolution of 2D display relates to the number of subpixels in the column direction of the pixel of 2D display.

In the embodiment, the first row of subpixels and the fourth row of subpixels in the pixel group 1 are mirror symmetrical, and the second row of subpixels and the third row of subpixels in the pixel group 1 are mirror symmetrical. Therefore, an improved shutter 3D display mode can be achieved and two rows of subpixels can be simultaneously scanned. In this case, the same data signal is input into two rows of subpixels at the same time, thereby ensuring sufficient display time of each row of subpixels and improving 3D display quality.

In the embodiment, the second row of subpixels and the third row of subpixels in each row of the pixel groups 1 are mirror symmetrical, and two adjacent rows of subpixels of any two rows of the pixel groups 1 adjacent in the column direction are mirror symmetrical. Therefore, when the display panel performs the improved shutter 3D display, the same data signal may be simultaneously input into the second row of subpixels and the third row of subpixels in the pixel groups 1 in each row, and the same data signal may be simultaneously input into two adjacent rows of subpixels of any two pixel groups 1 in adjacent rows, so that sufficient display time of each row of subpixels is ensured when the display panel performs the improved shutter 3D display.

In the embodiment, the red subpixel 111, the green subpixel 112 and the white subpixel 114 have the same area and light transmittance, and the blue subpixel 113 has the area and the light transmittance less than or equal to those of the white subpixel 114. The areas and the light transmittances of the white subpixel 114 and the blue subpixel 113 may be flexibly designed according to a difference of brightness when the display panel performs 2D display and 3D display, e.g., the brightness of picture in 3D display may be adjusted by blocking the white subpixel 114 with a black matrix, or the brightness of picture in 3D display may be adjusted by reducing the area and the light transmittance of the blue subpixel 113.

In the embodiment, the red subpixel 111, the green subpixel 112, the blue subpixel 113 and the white subpixel 114 have the same shape and all have a rectangle shape. The rectangle shape of the subpixel allows the display panel to switch from 2D display to 3D display very well when performing display, and allows the vertical resolution in 3D display to have no loss compared with the vertical resolution in 2D display.

In the embodiment, a length ratio between a long side and a short side of an entire rectangle consisting of the red subpixel 111, the green subpixel 112, the blue subpixel 113 and the white subpixel 114 in the sub-region 11 is equal to a length ratio between a long side and a short side of an entire rectangle consisting of the second row of subpixels and the third row of subpixels in the pixel group 1, and the length ratio between the long side and the short side of the entire rectangle consisting of the red subpixel 111, the green subpixel 112, the blue subpixel 113 and the white subpixel 114 in the sub-region 11 is equal to a length ratio between a long side and a short side of an entire rectangle consisting of two adjacent rows of subpixels of any two pixel groups 1 adjacent in the column direction of the pixel group 1. Therefore, the picture in 3D display will not have burrs at edges (e.g., the edges of 3D picture do not have a serrate shape), and especially the edges of linear 3D picture will be smoother, so that the display effect after the display mode of the display panel converts from 2D display to 3D display becomes better than that in prior art.

On the basis of the above subpixel arrangement of the display panel, an embodiment of the present invention further provides a method of driving the display panel, the method comprises steps of: constituting a pixel 12 of 2D display by use of the red subpixel 111, the green subpixel 112, the blue subpixel 113 and the white subpixel 114 in the sub-region 11 when the display panel performs 2D display; and constituting a pixel 13 of 3D display by use of the second row of subpixels and the third row of subpixels in the pixel group 1 and constituting another pixel 13 of 3D display by use of two adjacent rows of subpixels of any two pixel groups 1 adjacent in the column direction of the pixel group 1 when the display panel performs 3D display.

In the embodiment, when the display panel performs 3D display, the first row of subpixels of the pixel groups 1 in the first row and the last row of subpixels of the pixel groups 1 in the last row are turned off, the second row of subpixels and the third row of subpixels of the pixel groups 1 in a row are driven by the same data signal at the same time, and two adjacent rows of subpixels of two rows of pixel groups 1 adjacent in the column direction are driven by the same data signal at the same time.

That is, 3D display in the embodiment utilizes an improved shutter 3D display mode (i.e., ASG mode 3D display). Basic principle of the improved shutter 3D display is that, charging time of subpixels in each row is increased by simultaneously scanning two rows of subpixels, refresh rate of picture is decreased from 60 Hz in 2D display to 30 Hz, pictures displayed by the display panel are sent out in a frame sequence with continuous alternation of left and right (alternation of left and right eye pictures), then the picture signals are received through shutter 3D glasses in synchronous refresh rate, and the same number of frames as that in 2D picture are kept to be transmitted to user's eyes. Since the refresh rate of picture is very fast, it allows user's brain to generate 3D vision so as to form the 3D picture.

The above method of driving the display panel ensures sufficient display time of each row of subpixels and ensures that the vertical resolution in 3D display is the same as that in 2D display, so that the display effect after the display mode of the display panel switches from 2D display to 3D display becomes better than that in prior art.

In the embodiment, when the display panel is in a normally black display mode, the data signal input into the first row of subpixels in the first row of pixel groups 1 and the last row of subpixels in the last row of pixel groups 1 is in low level. When the display panel is in a normally white display mode, the data signal input into the first row of subpixels in the first row of pixel groups 1 and the last row of subpixels in the last row of pixel groups 1 is in high level. That is, when the display panel is in the normally black display mode, the first row of subpixels in the first row of pixel groups 1 and the last row of subpixels in the last row of pixel groups 1 are turned off in a manner of inputting the data signal of low level, and when the display panel is in the normally white display mode, the first row of subpixels in the first row of pixel groups 1 and the last row of subpixels in the last row of pixel groups 1 are turned off in a manner of inputting the data signal of high level. An initial frame scanning signal of the display panel corresponds to the second row of subpixels in the first row of pixel groups 1. That is, the initial frame scanning signal is input into the second row of subpixels in the first row of pixel groups 1.

Since the first row of subpixels in the first row of pixel groups 1 and the last row of subpixels in the last row of pixel groups 1 do not constitute a complete pixel when the display panel performs 3D display, they are turned off when the display panel performs 3D display. Since only the first and last rows of subpixels in the display panel are turned off, it will not cause a significant impact on 3D display.

In the embodiment, the white subpixels 114 in the display panel are in the normally black display state when the display panel performs 2D display, and the white subpixels 114 in the display panel are in the normally white display state when the display panel performs 3D display. Therefore, the loss of brightness when the display mode of the display panel switches from 2D display to 3D display may be avoided, so that the brightness of picture in 3D display is the same as that in 2D display.

It should be noted that, the white subpixels 114 in the display panel may also be in the normally white state when the display panel performs 2D display. In order to allow the brightness of picture in 3D display to be the same as that in 2D display, the display brightness (i.e., grayscale) of the white subpixels in the normally white display state may be adjusted so that the brightness of picture in 3D display is eventually the same as that in 2D display.

An embodiment of the present invention also provides a method of driving a display panel, the display panel in this embodiment has the same subpixel arrangement as the display panel in the aforementioned embodiment. In this embodiment, first polarizing films are provided at the positions corresponding to odd rows of subpixels in each row of the pixel groups, and second polarizing films are provided at the positions corresponding to even rows of subpixels in each row of the pixel groups. In this embodiment, the first row of subpixels in the first row of pixel groups and the last row of subpixels in the last row of pixel groups are turned off when the display panel performs 3D display, the odd rows of subpixels and the even rows of subpixels are driven row by row, pictures displayed by the odd rows of subpixels in each row of pixel groups form a left eye picture, and pictures displayed by the even rows of subpixels in each row of pixel groups form a right eye picture.

It should be noted that, the pictures displayed by the odd rows of subpixels in each row of pixel groups may also form the right eye picture, and the pictures displayed by the even rows of subpixels in each row of pixel groups may also form the left eye picture.

That is, 3D display in this embodiment utilizes a polarized 3D display mode (i.e., FPR mode 3D display). Basic principle of the FPR mode 3D display is that, the polarizing films are provided at both of the display panel and the glasses for watching, a frame of picture is divided into two pictures (i.e., the left eye picture and the right eye picture) after being sent out from the display panel, and the pictures are transmitted to viewer's eyes through polarized 3D glasses, then the brain of viewer performs image synthesis so that a 3D stereoscopic picture is viewed.

When the display panel performs 3D display, a frame of picture is divided into the left eye picture and the right eye picture, the vertical resolution of the 3D picture synthesized by the left eye picture and the right eye picture is equal to that of 2D picture, so that the display effect after the display mode of the display panel switches from 2D display to 3D display becomes better than that in prior art.

Other steps of the method of driving the display panel are the same as those in the aforementioned embodiment, and will be omitted herein.

In the display panel of the embodiment of the present invention, a plurality of pixel groups having the same internal subpixel arrangement structure are repeatedly arranged in a matrix throughout the display panel, four colors of subpixels in each sub-region constitute a pixel of 2D display when the display panel performs 2D display, the second row of subpixels and the third row of subpixels in each pixel group constitute a pixel of 3D display and two adjacent rows of subpixels in any two pixel groups adjacent in the column direction of the pixel group constitute another pixel of 3D display when the display panel performs 3D display, so that the number of subpixels in each column of the pixel of 2D display is equal to the number of subpixels in each column of the pixel of 3D display, and the vertical resolution when the display panel performs 3D display is equal to the vertical resolution when the display panel performs 2D display. In addition, the pixel arrangement in the display panel allows the subpixels with any one color in each pixel to include two subpixels with the same color when the display panel performs 3D display, so that the brightness of picture in 3D display has no loss compared with the brightness of picture in 2D display, thereby avoiding the loss of brightness after the display mode of the display panel switches from 2D display to 3D display, which allows the brightness in 3D display to be equal to the brightness in 2D display, and allows the display panel to achieve the same display quality and display effect when performing 3D display and 2D display.

In the method of driving the display panel according to the embodiment of the present invention, on the basis of the subpixel arrangement structure of the display panel, switching from 2D display to 3D display can be achieved, and the vertical resolution of 3D picture in the improved shutter 3D display mode and the polarized 3D display mode can be equal to the vertical resolution of 2D picture, so that the display quality and the display effect after switching from 2D display to 3D display are improved.

An embodiment of the present invention also provides a display device that comprises the above display panel.

The display quality and the display effect of the display device are improved by utilizing the above display panel.

It could be understood that, the above implementation ways are merely exemplary embodiments adopted for describing the principle of the present invention, but the present invention is not limited thereto. Various modifications and improvements may be made by those of ordinary skill in the art without departing from the spirit and essence of the present invention, and these modifications and improvements are contemplated as within the protection scope of the present invention.

The invention claimed is:

1. A method of driving a display panel, the display panel comprising a plurality of pixel groups repeatedly arranged in a row direction and a column direction, each of the pixel groups having the same arrangement structure of subpixels, wherein each of the pixel groups comprises four different sub-regions that arrange in a matrix with two rows and two columns; each of the sub-regions has one first color subpixel, one second color subpixel, one third color subpixel and one fourth color subpixel provided therein, and the first color subpixel, the second color subpixel, the third color subpixel and the fourth color subpixel in each of the sub-regions arrange in a matrix with two rows and two columns; each row of subpixels in the pixel group consist of one first color subpixel, one second color subpixel, one third color subpixel and one fourth color subpixel; and a first row of subpixels and a fourth row of subpixels in the pixel group have the same arrangement structure of subpixels, and a second row of subpixels and a third row of subpixels in the pixel group have the same arrangement structure of subpixels, the method comprising:

constituting a pixel of 2D display by using the first color subpixel, the second color subpixel, the third color subpixel and the fourth color subpixel in each sub-region when the display panel performs 2D display; and constituting a pixel of 3D display by using the second row of subpixels and the third row of subpixels in each pixel group and constituting another pixel of 3D display by use of two adjacent rows of subpixels of any two pixel groups adjacent in the column direction of the pixel group when the display panel performs 3D display.

2. The method of claim 1, wherein when the display panel performs 3D display, the method comprises:

turning off the first row of subpixels of the pixel groups in the first row and the last row of subpixels of the pixel groups in the last row;

driving the second row of subpixels and the third row of subpixels of the pixel groups in a row by using the same data signal at the same time; and driving two adjacent rows of subpixels of two rows of pixel groups adjacent in the column direction by using the same data signal at the same time.

3. The method of claim 1, wherein first polarizing films are provided at the positions corresponding to odd rows of subpixels in each row of pixel groups, and second polarizing films are provided at the positions corresponding to even rows of subpixels in each row of pixel groups, when the display panel performs 3D display, the method comprises:

turning off the first row of subpixels of the pixel groups in the first row and the last row of subpixels of pixel groups in the last row;

driving odd rows of subpixels and even rows of subpixels row by row;

forming a left eye picture by using pictures displayed by the odd rows of subpixels of the pixel groups in each row, and forming a right eye picture by using pictures displayed by the even rows of subpixels of the pixel groups in each row, or forming a right eye picture by using pictures displayed by the odd rows of subpixels of the pixel groups in each row, and forming a left eye picture by using pictures displayed by the even rows of subpixels of the pixel groups in each row.

4. The method of claim 2, wherein when the display panel is in a normally black display mode, the data signal input into the first row of subpixels of the pixel groups in the first row and the last row of subpixels of the pixel groups in the last row is in low level;

when the display panel is in a normally white display mode, the data signal input into the first row of subpixels of the pixel groups in the first row and the last row of subpixels of the pixel groups in the last row is in high level; and an initial frame scanning signal of the display panel corresponds to the second row of subpixels of the pixel groups in the first row.

5. The method of claim 3, wherein when the display panel is in a normally black display mode, the data signal input into the first row of subpixels of the pixel groups in the first row and the last row of subpixels of the pixel groups in the last row is in low level;

when the display panel is in a normally white display mode, the data signal input into the first row of subpixels of the pixel groups in the first row and the last row of subpixels of the pixel groups in the last row is in high level; and an initial frame scanning signal of the display panel corresponds to the second row of subpixels of the pixel groups in the first row.

6. The method of claim 1, wherein the first color subpixel is a red subpixel, the second color subpixel is a green subpixel, the third color subpixel is a blue subpixel, and the fourth color subpixel is a white subpixel.

7. The method of claim 6, wherein the white subpixels in the display panel are in a normally black display state or a normally white display state when the display panel performs 2D display;

the white subpixels in the display panel are in the normally white display state when the display panel performs 3D display.

* * * * *